United States Patent [19]

Perry

[11] Patent Number: 4,998,814

[45] Date of Patent: Mar. 12, 1991

[54] EXTERIOR REARVIEW MIRROR ASSEMBLY

[75] Inventor: William M. Perry, Palestine, Ohio

[73] Assignee: Sheller-Globe Corporation, Detroit, Mich.

[21] Appl. No.: 478,631

[22] Filed: Feb. 12, 1990

[51] Int. Cl.⁵ .............................................. G02B 7/18
[52] U.S. Cl. ..................................... 350/632; 350/631
[58] Field of Search ................................ 356/631, 632

[56] References Cited

U.S. PATENT DOCUMENTS

| 3,439,646 | 4/1969 | Helle | 350/632 |
| 3,513,807 | 5/1970 | Helle | 350/632 |
| 4,538,851 | 9/1985 | Taylor | 350/631 |

*Primary Examiner*—Bruce Y. Arnold
*Assistant Examiner*—J. P. Ryan
*Attorney, Agent, or Firm*—Barnes, Kisselle, Raisch, Choate, Whittemore & Hulbert

[57] ABSTRACT

An exterior rearview mirror assembly that is attached to the side wall of the door of a vehicle having a mirror shell housing mounted on the side wall and a mirror mounting bracket mounted in cantilever fashion on the side wall. The mirror mounting bracket preferably comprises a body having a triangular shape cross section with first and second side walls forming a cavity, the cavity opening to a third side. A plurality of truss walls are interposed between the first and second side walls of the mirror mounting bracket and are constructed and arranged to increase the damping characteristics and natural frequency of the mirror mounting bracket.

32 Claims, 3 Drawing Sheets

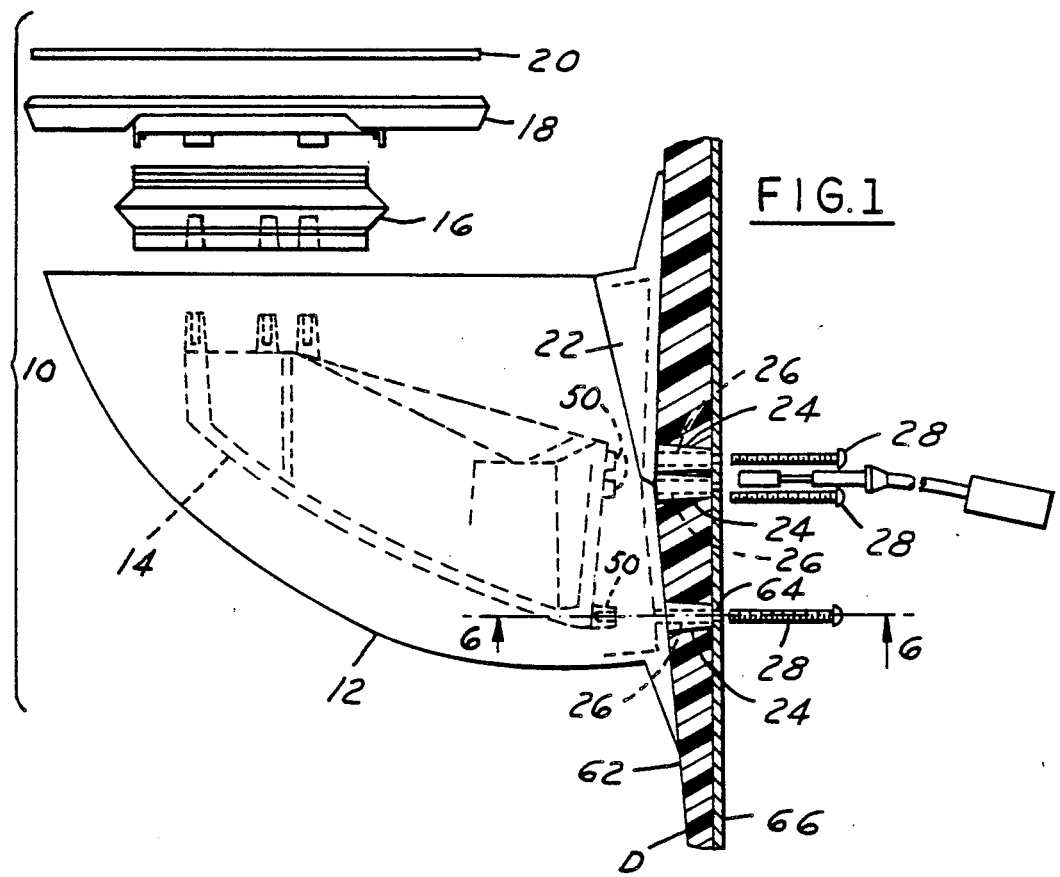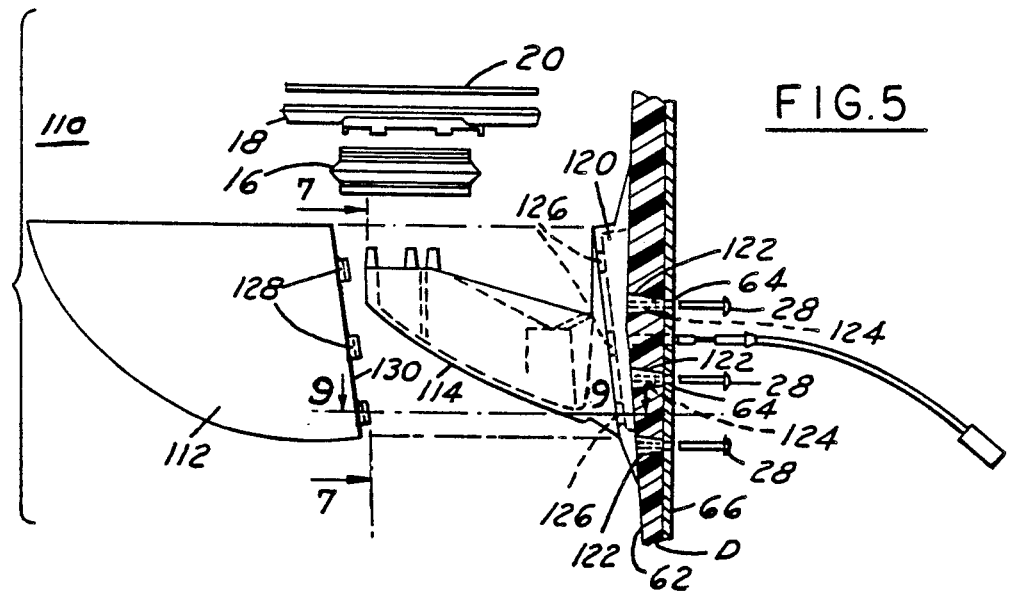

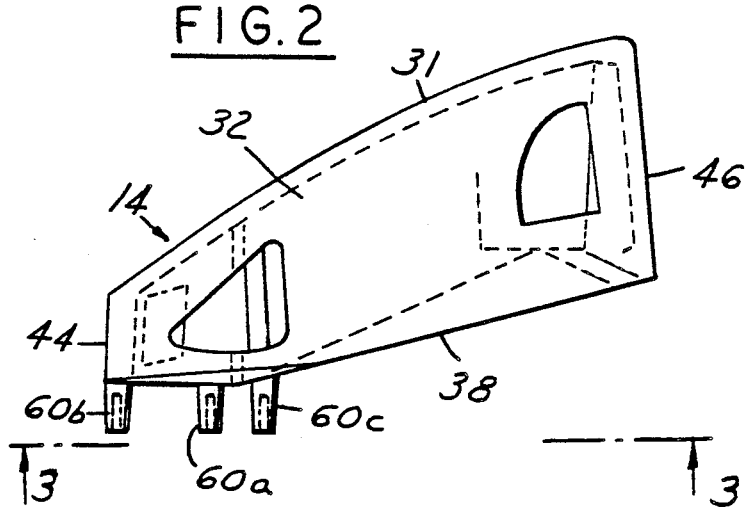
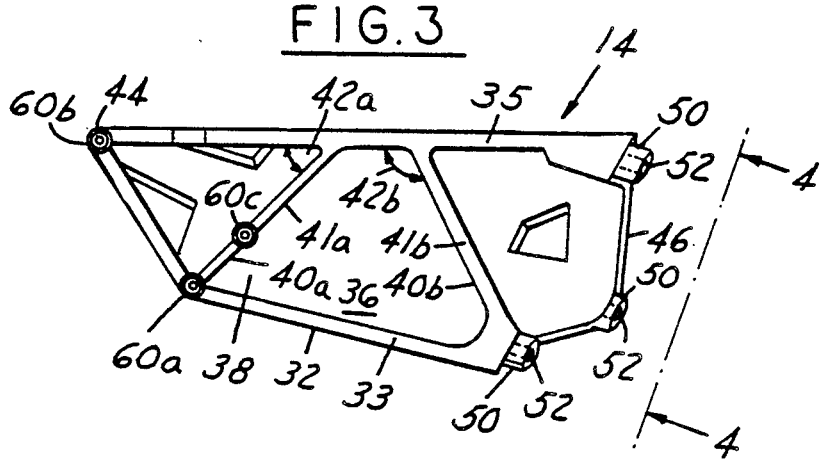
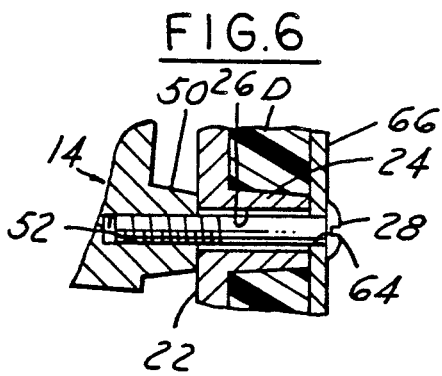
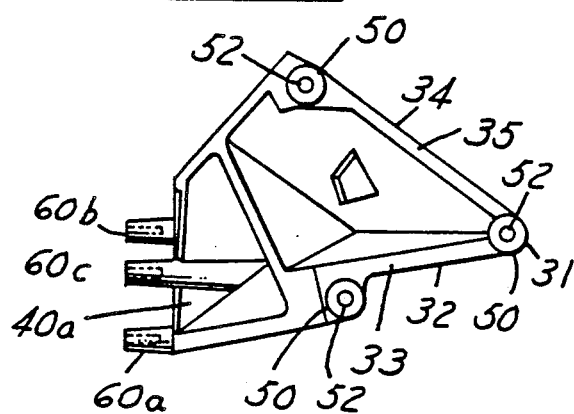

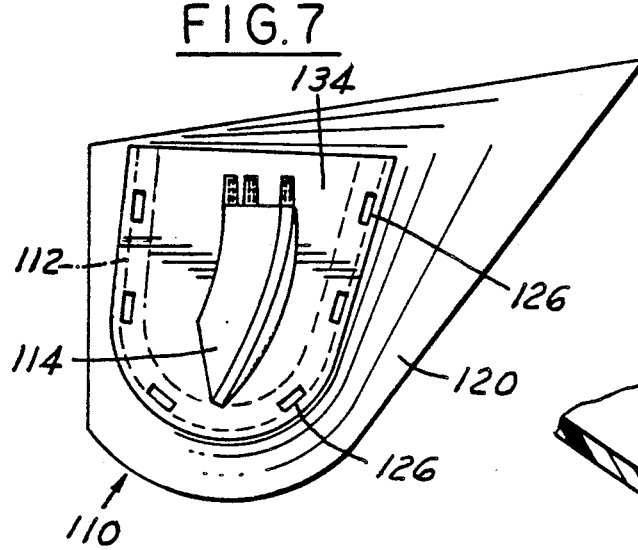
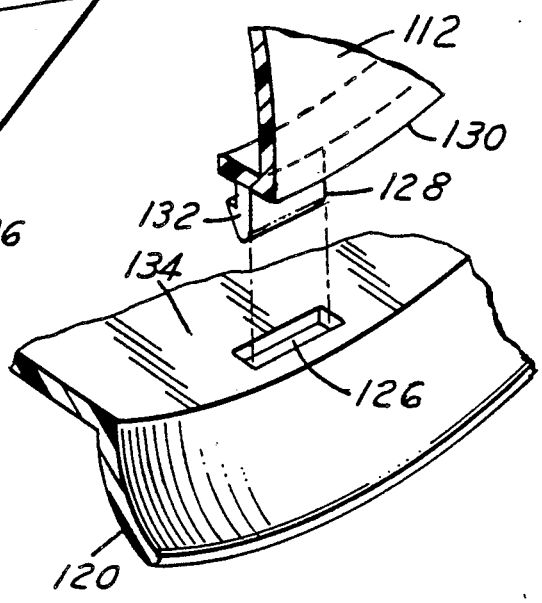
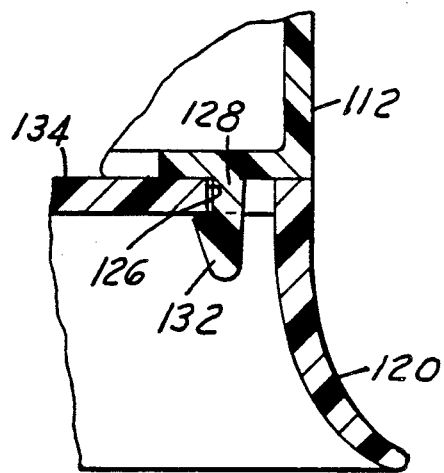
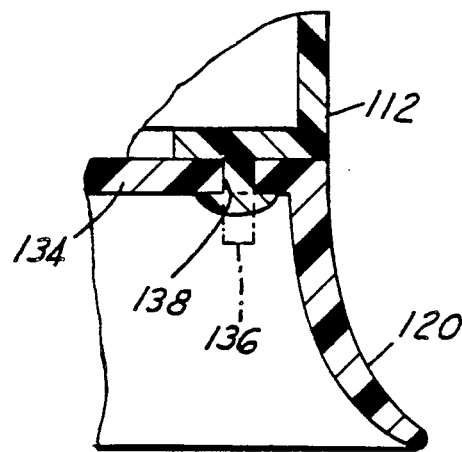

EXTERIOR REARVIEW MIRROR ASSEMBLY

This invention relates to an exterior rearview mirror assembly and particularly to a mirror assembly wherein the mirror is isolated so that vibration thereof is minimized.

BACKGROUND AND SUMMARY OF THE INVENTION

Current aerodynamic exterior rearview mirror assemblies for vehicles comprise a mirror supported by a bracket that is mounted on a shell housing. This construction has led to several problems, the primary one being vibration caused by the door panel of the vehicle which is transmitted to the shell housing and, in turn, the rearview mirror. This vibration causes image distortion when viewed by the operator of the vehicle. Another problem is the quality of the manufacture of the mirror shell housing, which stems from the shrinkage caused by the mounting bosses molded for the purpose of holding mounting brackets, motor components and manual actuating mechanisms. Another problem specific to electrically operated rearview mirror assemblies, is that the mirror shell housing may amplify the noise generated by the electric motor mechanism.

Among the objectives of the present invention are to provide a rearview mirror assembly which minimizes the vibration from the door panel; which minimizes noise amplification within the mirror shell housing; which utilizes plastic compositions to dampen vibration from the door system; wherein the mirror has a natural frequency higher than the natural frequency of the door panel; and which is to provide relatively simple and economical design, manufacture and assembly.

In accordance with the invention, an exterior rearview mirror assembly that is attached to the side wall of the door of a vehicle having a mirror shell housing mounted on the side wall and a mirror mounting bracket mounted in cantilever fashion on the side wall. The mirror mounting bracket preferably comprises a body having a triangular shape cross section with first and second side walls forming a cavity, the cavity opening to a third side. A plurality of truss walls are interposed between the first and second side walls of the mirror mounting bracket and are constructed and arranged to increase the damping characteristics and natural frequency of the mirror mounting bracket.

A plurality of integral bosses are provided on one end of the mirror mounting bracket and receive bracket screws that hold the mounting bracket to the door of the vehicle. A plurality of integral sleeves project from the third side of the mounting bracket and a mirror mounting mechanism is mounted thereon.

The mirror mounting bracket is preferably fabricated from a glass and mineral filled nylon fiber material and preferably the fibers of the nylon material are oriented longitudinally of the mirror mounting bracket.

An important advantage of this present invention is that by isolating the mirror mounting bracket from the mirror shell housing and designing the mirror mounting bracket to dampen the vibration from the door, image distortion problems are eliminated and noise is reduced within the mirror shell housing.

Other objects and features of the invention will become apparent in the following description and claims in which the invention is described together with the details to enable persons skilled in the art to practice the invention, all in connection with the best mode presently contemplated for the invention.

DESCRIPTION OF THE DRAWINGS

FIG. 1 is an exploded view of an exterior rearview mirror assembly embodying the invention;

FIG. 2 is an enlarged plan view of a mirror mounting bracket embodying the invention;

FIG. 3 is an enlarged elevational view taken along line 3—3 in FIG. 2;

FIG. 4 is an enlarged end view taken along line 4—4 in FIG. 3;

FIG. 5 is an exploded plan view of an alternate embodiment of the invention;

FIG. 6 is an enlarged fragmentary sectional view taken along line 6—6 in FIG. 1;

FIG. 7 is an end view taken along line 7—7 in FIG. 5;

FIG. 8 is an enlarged fragmentary view of a shell housing and a mounting flange of FIG. 5;

FIG. 9 is an enlarged fragmentary sectional view taken along line 9—9 of FIG. 5; and FIG. 10 is an enlarged fragmentary sectional view of a modified form of the alternate embodiment of the invention.

DETAILED DESCRIPTION

The preferred embodiment of the present invention is illustrated in FIGS. 1-4. With specific reference to FIG. 1, an exterior rearview mirror assembly 10 includes a mirror shell housing 12 attached to door D and for enclosing mirror mounting bracket 14, mirror mounting mechanism 16, mirror casing 18 and mirror 20. Shell housing 12 has a mounting flange portion 22 having a plurality of projections or bosses 24 that extend into door D. Each projection 24 has a centrally located bore 26 through which a screw 28 may pass through.

The mirror mounting bracket 14 has a tapering elongated body with a generally triangular cross section that extends in a cantilever fashion from the door of the vehicle. The mounting bracket 14 has a first side wall 32 and a second side wall 34 that are outwardly convex and integral along one edge 31 and define an included acute angle (See FIGS. 3 and 4). Free edges 33, 35 of walls 32, 34 define an opening 38 for a cavity 36. Interposed between and integral with side walls 32, 34 are a plurality of planar truss walls 40. Preferably, there are at least two truss walls 40a, 40b located within cavity 36 and the edges 41a, 41b of the truss walls 40a, 40b are in generally the same plane as the free edges 33, 35 of side walls 32, 34. It is preferred that the two truss walls 40a, 40b have an included acute angle between the intersecting lines of the truss walls. Wall 40a is at an acute angle 42a, preferably 45°, with side wall 34 and intersects wall 32. Wall 40b is at an obtuse angle 42b, preferably 117°, with side wall 34. Both walls 40a, 40b provide reinforcement to the mounting bracket 14 by cooperating with walls 32, 34 and increase the dampening characteristic of and the natural frequency of the rearview mirror assembly 10.

One end of mounting bracket 14, side wall 32 and side wall 34 is closed to form a closed end edge 44, (see FIG. 2). The free end of the bracket 14 is open to define an edge 46. A plurality of bosses 50 are integral to and project from open end edge 46. A bore 52 is centrally located on each boss 50 to interengage with the threaded end of screw 28.

A plurality of integral sleeves 60 project from opening 38 and are integral to mounting bracket 14. Preferably there are three sleeves, two of the sleeves 60a, 60b are on the perimeter of wall 32 and the third sleeve 60c preferably along wall 40a. These sleeves 60a,b,c are adapted to receive and to secure mirror mounting mechanism 16 shown in FIG. 1.

To attach mirror assembly 10 to the vehicle, the mounting flange portion 22 of shell housing 12 is placed against the exterior wall 62 of door D which is made of thin metal or plastic. The bosses 24 are placed flush against and aligned with holes 64 on interior wall 66 of door D. As shown in FIG. 6, the mirror mounting bracket 14 then is placed within shell housing 12 and has bosses 50 aligned with bosses 24 so that the mounting bracket 14 extends in a cantilever fashion from the door of the vehicle. Bracket screws 28 ar then pushed through holes 64 and through bore 26 of each boss 24 and are threaded into bores 52 of bosses 50 of the mirror mounting bracket 14. Preferably, three screws 28 are used to secure this preferred embodiment of the mirror assembly 10 to the vehicle door D.

In the form of mirror assembly 110 shown in FIG. 5, the mirror mounting bracket 114 has all the features of mirror mounting bracket 14 with the addition of a mounting flange portion 120. This mounting flange 120 includes projecting bosses 122 having centrally located bores 124. Mounting flange portion 120 is firmly placed against the exterior side 62 of door D and has bores 124 aligned with holes 64 in interior wall 66 to interengage bracket screws 28 (see FIG. 5).

Shell housing 112 provides a protective covering over mirror mechanism 16, mirror casing 18 and mirror 20. Unlike shell housing 12, shell housing 112 has no base portion and in no way touches the door D. Instead, shell housing 112 is secured to mounting flange 120 of mirror mounting bracket 114. Mounting flange 120 has a plurality of slots 126 on wall 134 (see FIG. 7) which are aligned with a plurality of extending rectangular tabs 128 along the perimeter of side 130 of shell housing 112. As shown in detail in FIGS. 8 and 9, each tab 128 has an integral locking detent 132 on its free end. Tabs 128 project into and interengage with wall 134 forming slots 126 to provide a detachably mounted protective shell housing 112 around the rearview mirror 20. FIG. 10 shows a modified form of interengagement between the shell 112 and mounting flange 120. The shell 112 instead has a plurality of heat stakes 136 that are introduced into an opening 138 in wall 134 of mounting flange 120. Once in place, the stakes 136 are heated on the inside of the mounting flange 120 to capture wall 134 forming opening 138 (see FIG. 10).

Both mirror mounting brackets 14, 114 are preferably made of a plastic composition comprising a mixture of glass fibers and mineral nylon fibers. The mixture may contain as much as 25% glass and 30% mineral. This material increases the dampening characteristic and the natural frequency to the mirror mounting brackets 14, 114. Preferably, the fibers of the nylon material are oriented longitudinally from end 44 toward open end 46 of the mirror mounting bracket 14. This orientation further enhances the dampening characteristic and the natural frequency of the mirror mounting bracket 14, 114. The natural frequency selected for the mirror mounting bracket 14, 114 is at least 25% higher but preferably less than 200% higher than the natural frequency of the door system. This range of frequencies would minimize the vibration from the door system and steadily secures the mirror 20 for operator viewing.

In operation, an operator operates these exterior rearview mirrors as in the prior art. There is no difference in the operation of the mirror but there is a noticable difference in the viewability through mirror 20. The mirror of this invention is isolated from vibration amplified through the shell housing which results in no viewable image distortion. If the mirror assembly includes a motor, the mirror assembly operates more quietly with no amplification of the noise from operation of motor mechanisms. This mirror assembly is composed of materials specifically designed to minimizing vibration and reduce noise amplification.

I claim:

1. An exterior rearview mirror assembly for an automotive vehicle comprising:
   a shell housing;
   means for mounting said housing on a door panel of the vehicle;
   a mirror;
   a mirror mounting mechanism for supporting said mirror; and
   a mirror mounting bracket for supporting said mirror mounting mechanism and said mirror within said shell housing, wherein said mounting bracket comprises a body, means for securing said body to a door panel for a vehicle such that said bracket extends in a cantilever fashion from said door panel and means for attaching the rearview mirror to said body;
   said mounting means comprising a mounting flange integral and on one end of said shell housing having at least three integral bosses projecting from said flange and mountable on the door panel of the vehicle;
   said body of said mirror mounting bracket having a triangular shaped cross section having first and second side walls forming a cavity.

2. The exterior rearview mirror assembly as set forth in claim 1 wherein said mirror mounting bracket further comprises means for reinforcing said two side walls of said body.

3. The exterior rearview mirror assembly as set forth in claim 2 wherein said reinforcing means comprises at least two planar truss walls interposed between said first and second side walls of said body and such as to increase the damping characteristics of and decrease the natural frequency of the mirror mounting bracket.

4. An exterior rearview mirror assembly for an automotive vehicle comprising:
   a shell housing;
   means for mounting said housing on a door panel of the vehicle;
   a mirror;
   a mirror mounting mechanism for supporting said mirror; and
   a mirror mounting bracket for supporting said mirror mounting mechanism and said mirror within said shell housing, wherein said mounting bracket comprises a body, means for securing said body to a door panel of a vehicle such that said bracket extends in a cantilever fashion from said door panel and means for attaching the rearview mirror to said body;
   said mounting means comprising a mounting flange integral and on one end of said shell housing having at least three integral bosses projecting from said flange and mountable on the door panel of the vehicle;

said mirror mounting bracket body having a tapering triangular shape having two side walls integral along one edge and on a closed end, wherein free edges of said side wall define an opening to a cavity and an open end opposite said closed end, such that said open end of said bracket secures to a door panel of a vehicle and said bracket body extends in a cantilever fashion from said door panel.

5. The exterior rearview mirror assembly as set forth in claim 4 wherein said securing means comprises at least three integral bosses on said open end of said body and for receiving screws.

6. The exterior rearview mirror assembly as set forth in claim 5 wherein said bosses project from and are positioned on said free edges of said side wall defining said open end of said body.

7. The exterior rearview mirror assembly as set forth in claim 4 wherein said attaching means comprises at least three integral sleeves on said opening of said body.

8. The exterior rearview mirror assembly as set forth in claim 7 wherein said sleeves project from said opening of said body and are positioned adjacent said closed end of said body.

9. An exterior rearview mirror assembly for an automotive vehicle comprising:
a shell housing;
means for mounting said housing on a door panel of the vehicle;
a mirror;
a mirror mounting mechanism for supporting said mirror; and
a mirror mounting bracket for supporting said mirror mounting mechanism and said mirror within said shell housing, wherein said mounting bracket comprises a body, means for securing said body to a door panel of a vehicle such that said bracket extends in a cantilever fashion from said door panel and means for attaching the rearview mirror to said body;
said mounting means comprising a mounting flange on one end of said body of said mirror mounting bracket, said mounting flange having a plurality of slots and said shell housing having a plurality of tabs aligned and engageable with said slots.

10. The exterior rearview mirror assembly as set forth in claim 9 wherein said body has a triangular shaped cross section opposite said mounting flange, and first and second side walls forming a cavity.

11. The exterior rearview mirror assembly as set forth in claim 10 wherein said mirror mounting bracket further comprises means for reinforcing said two side walls of said body.

12. The exterior rearview mirror assembly as set forth in claim 11 wherein said reinforcing means comprises at least two planar truss walls interposed between said first and second side walls of said body and constructed and arranged to increase the damping characteristics of and decrease the natural frequency of the mirror mounting bracket 13. The exterior rearview mirror assembly as set forth in claim 9 wherein said mirror mounting bracket is made of a plastic composition.

14. The exterior rearview mirror assembly as set forth in claim 13 wherein said plastic composition comprises a mixture of glass fibers and mineral filled nylon.

15. The exterior rearview mirror assembly a set forth in claim 14 wherein said glass fibers are oriented longitudinally of said body.

16. The exterior rearview mirror assembly as set forth in claim 9 wherein said mirror mounting bracket body has a tapering triangular shape having a mounting flange on one end, and two side walls integral along one edge and a closed end, wherein free edges of said side walls define an opening to cavity, such that said mounting flange of said bracket secures to a door panel of a vehicle and said bracket body extends in a cantilever fashion from said door panel.

17. The exterior rearview mirror assembly as set forth in claim 16 wherein said securing means comprises at least three integral bosses projecting from said mounting flange of said body and for receiving screws.

18. The exterior rearview mirror assembly as set forth in claim 16 wherein said attaching means comprises at least three integral sleeves on said opening of said body.

19. The exterior rearview mirror assembly as set forth in claim 18 wherein said sleeves project from said open side of said body and are positioned adjacent said closed end of said body.

20. A mirror mounting bracket for supporting an exterior rearview mirror for a vehicle comprises:
a body;
means for securing said body to a door panel of a vehicle such that said bracket extends in cantilever fashion from said door panel; and
means for attaching the rearview mirror to said body;
said body having a triangular shaped cross section having first and second side walls forming a cavity.

21. The mirror mounting bracket as set forth in claim 20 wherein said mirror mounting bracket further comprises means for reinforcing said two side walls of said body.

22. The mirror mounting bracket as set forth in claim 21 wherein said reinforcing means comprises at least two planar truss walls interposed between said first and second side walls of said body and constructed and arranged to increase the damping characteristics of and decrease the natural frequency of the mirror mounting bracket.

23. The mirror mounting bracket as set forth in claim 22 wherein said mirror mounting bracket is made of a plastic composition.

24. The mirror mounting bracket as set forth in claim 23 wherein said plastic composition comprises a mixture of glass fibers and mineral filled nylon fibers.

25. A mirror mounting bracket for supporting an exterior rearview mirror for a vehicle comprises:
a body;
means for securing said body to a door panel of a vehicle such that said bracket extends in cantilever fashion from said door panel; and
means for attaching the rearview mirror to said body;
said body having a tapering triangular shape having two side walls integral along one edge and on a closed end, wherein free edges of said side wall define an opening to a cavity and an open end opposite said closed end, such that said open end of said bracket secures to a door panel of a vehicle and said bracket and said body extend in a cantilever fashion from said door panel.

26. The mirror mounting bracket as set forth in claim 25 wherein said securing means comprises at least three integral bosses on said open end of said body for receiving screws.

27. The mirror mounting bracket as set forth in claim 26 wherein said bosses project from and are positioned on said free edges of said side walls defining said open end of said body.

28. The mirror mounting bracket as set forth in claim 25 wherein said attaching means comprises at least three integral sleeves on said open side of said body.

29. The mirror mounting bracket as set forth in claim 28 wherein said sleeves project from said open side of said body and are positioned adjacent said closed end of said body.

30. An exterior rearview mirror assembly for an automotive vehicle comprising:
   a shell housing;
   means for mounting said housing on a door panel of the vehicle;
   a mirror;
   a mirror mounting mechanism for supporting said mirror' and
   a mirror mounting bracket for supporting said mirror mounting mechanism and said mirror within said shell housing, wherein said mounting bracket comprises a body, means for securing said body to a door panel of a vehicle such that said bracket extends in a cantilever fashion from said door panel and means for attaching the rearview mirror to said body;
   said mirror mounting bracket body having a shape having two generally opposed side walls integral along one edge and on a closed end, wherein free edges of said side wall define an opening to a cavity and an open end opposite said closed end, such that said open end of said bracket secures to a door panel of a vehicle and said bracket body extends in a cantilever fashion from said door panel.

31. The exterior rearview mirror assembly as set forth in claim 41 wherein said said mirror mounting bracket is made of a plastic composition;
   said plastic composition comprises a mixture of glass fibers and minerals filled nylon fibers;
   said fibers being oriented longitudinally of said body.

32. An exterior rearview mirror assembly for an automotive vehicle comprising:
   a shell housing;
   means for mounting said housing on a door panel of the vehicle;
   a mirror;
   a mirror mounting mechanism for supporting said mirror; and
   a mirror mounting bracket for supporting said mirror mounting mechanism and said mirror within said shell housing, wherein said mounting bracket comprises a body, means for securing said body to a door panel of a vehicle such that said bracket extends in a cantilever fashion from said door panel and means for attaching the rearview mirror to said body;
   said mirror mounting bracket body having a shape having two generally opposed side walls integral along one edge, wherein free edges of said side wall define an opening to a cavity and an open end opposite said closed end, such that said open end of said bracket secures to a door panel of a vehicle and said bracket body extends in a cantilever fashion from said door panel.

* * * * *